United States Patent
Han

(10) Patent No.: US 10,731,969 B2
(45) Date of Patent: Aug. 4, 2020

(54) IN-LINE FIBER SENSING, NOISE CANCELLATION AND STRAIN DETECTION

(71) Applicant: NUtech Ventures, Inc., Lincoln, NE (US)

(72) Inventor: Ming Han, Lincoln, NE (US)

(73) Assignee: NUTECH VENTURES, Inc., Lincoln, NE (US)

( * ) Notice: Subject to any disclaimer, the term of this patent is extended or adjusted under 35 U.S.C. 154(b) by 0 days.

(21) Appl. No.: 15/573,301

(22) PCT Filed: May 12, 2016

(86) PCT No.: PCT/US2016/032101
§ 371 (c)(1),
(2) Date: Nov. 10, 2017

(87) PCT Pub. No.: WO2016/183321
PCT Pub. Date: Nov. 17, 2016

(65) Prior Publication Data
US 2018/0135971 A1    May 17, 2018

Related U.S. Application Data

(60) Provisional application No. 62/160,238, filed on May 12, 2015.

(51) Int. Cl.
*G01B 11/16* (2006.01)
*G01J 3/18* (2006.01)
(Continued)

(52) U.S. Cl.
CPC ....... *G01B 11/161* (2013.01); *G01D 5/35335* (2013.01); *G01J 3/0218* (2013.01);
(Continued)

(58) Field of Classification Search
CPC ..... G01B 11/161; G01D 5/35335; G01J 3/26; G01J 3/0218; G01J 3/18; G02B 6/4298;
(Continued)

(56) References Cited

U.S. PATENT DOCUMENTS

| 6,417,507 B1 | 7/2002 | Malvern et al. |
| 7,180,601 B1 * | 2/2007 | Davis ......................... G01J 3/18 356/480 |

(Continued)

FOREIGN PATENT DOCUMENTS

| KR | 10-2004-0105345 | 12/2004 | |
| WO | WO-9723766 A1 * | 7/1997 | ............. G01L 1/246 |

OTHER PUBLICATIONS

Notification of Transmittal of the International Search Report and the Written Opinion of the International Searching Authority—dated Aug. 22, 2016.

*Primary Examiner* — Hwa Andrew Lee
(74) *Attorney, Agent, or Firm* — Greer, Burns & Crain, Ltd.; Steven P. Fallon

(57) ABSTRACT

An in-line fiber-optic sensing element, a system, and methods for detecting strain using a fiber optic sensor are described that include using at least two chirped grating structures. In an implementation, an in-line fiber-optic sensing element that employs example techniques in accordance with the present disclosure includes an optically transmissive fiber including a core and an outer layer; a Fabry-Perot cavity defined by a portion of the optically transmissive fiber and two chirped fiber-Bragg grating structures, where the two chirped grating structures are separated and are configured to reflect light.

9 Claims, 12 Drawing Sheets

(51) Int. Cl.
- *G01J 3/26* (2006.01)
- *G01J 3/02* (2006.01)
- *G01D 5/353* (2006.01)
- *G02B 6/293* (2006.01)
- *G02B 6/02* (2006.01)
- *G02B 6/42* (2006.01)

(52) U.S. Cl.
CPC . *G01J 3/18* (2013.01); *G01J 3/26* (2013.01); *G02B 6/02085* (2013.01); *G02B 6/2938* (2013.01); *G02B 6/29356* (2013.01); *G02B 6/4298* (2013.01)

(58) Field of Classification Search
CPC .............. G02B 6/2938; G02B 6/29356; G02B 6/02085
See application file for complete search history.

(56) References Cited

U.S. PATENT DOCUMENTS

| | | | |
|---|---|---|---|
| 8,537,368 B2 * | 9/2013 | Kilic | G01H 9/004 356/480 |
| 2002/0057859 A1 * | 5/2002 | Walter | G01B 11/18 385/13 |
| 2003/0035626 A1 | 2/2003 | Smith | |
| 2005/0244094 A1 * | 11/2005 | Allsop | A61B 5/1077 385/13 |
| 2007/0280605 A1 | 12/2007 | Mendoza | |
| 2010/0313668 A1 | 12/2010 | Tao et al. | |

* cited by examiner

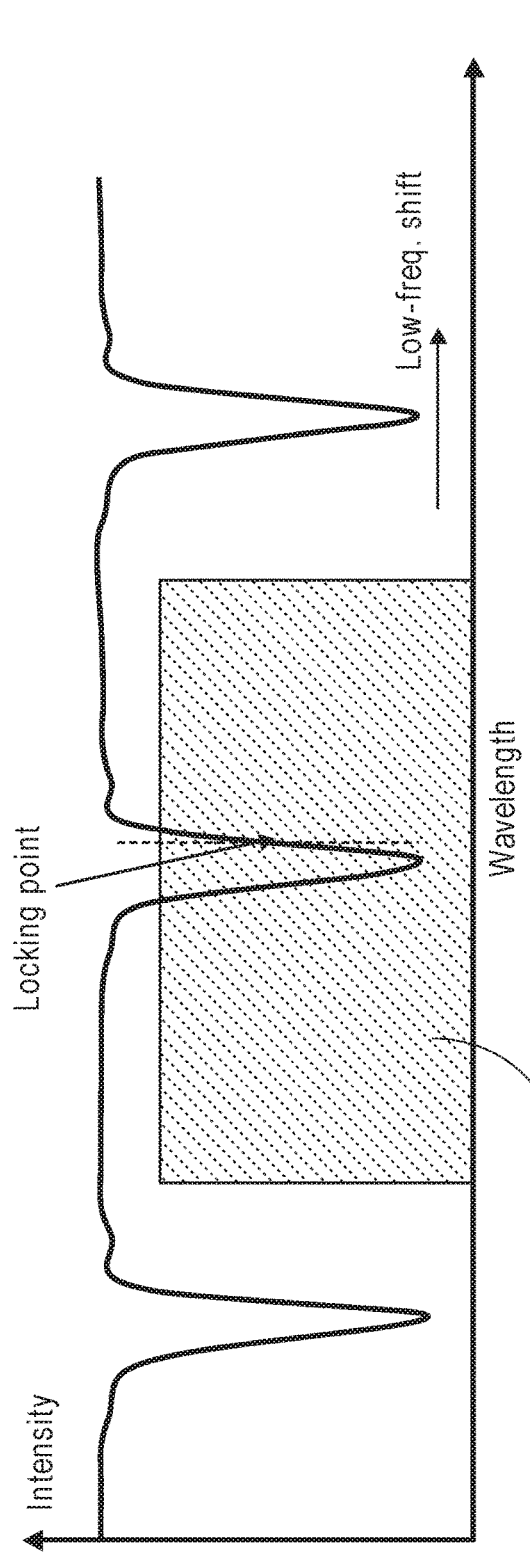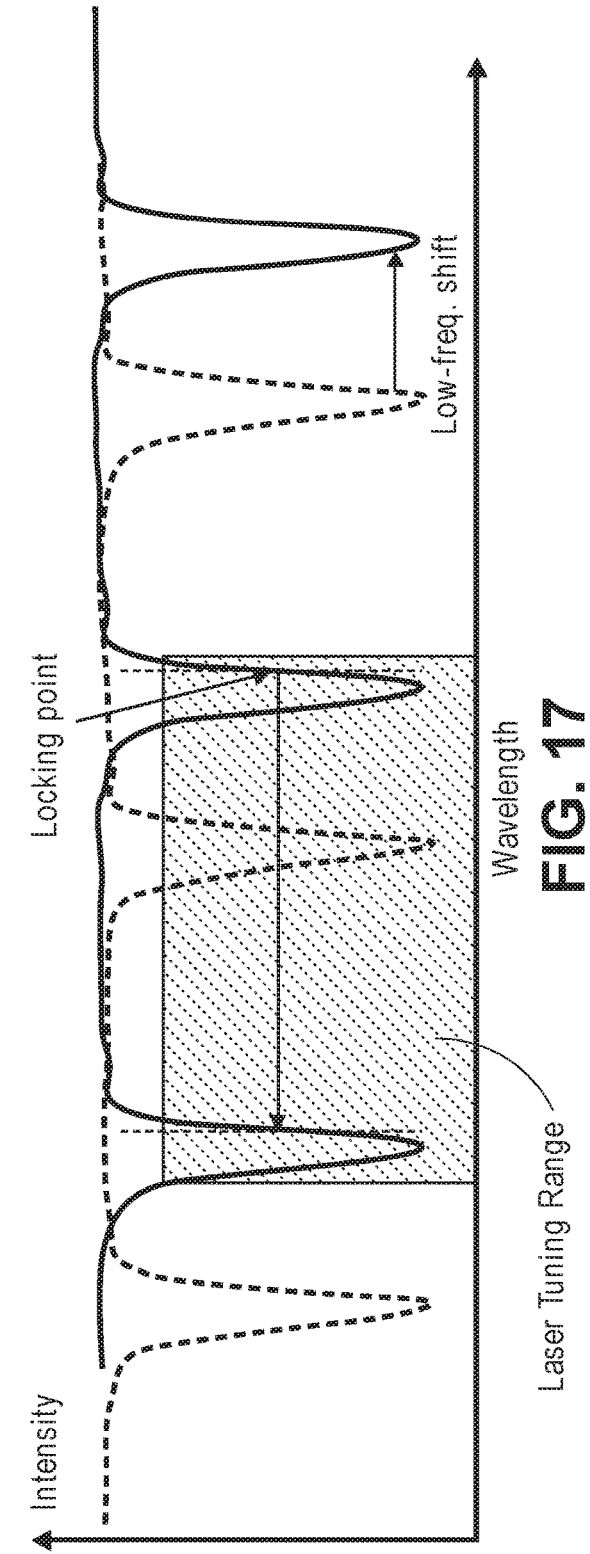

IN-LINE FIBER SENSING, NOISE CANCELLATION AND STRAIN DETECTION

FEDERALLY SPONSORED RESEARCH OR DEVELOPMENT

This invention was made with Government support under contract N00014-14-1-0456 awarded by the Office of Naval Research. The Government has certain rights in this invention.

BACKGROUND

An optical fiber can include a flexible, transparent fiber made of extruded glass (silica) or plastic. Light can be transmitted between two ends of the optical fiber, which may be used in fiber-optic communications. A fiber optic sensor uses an optical fiber either as the sensing element (e.g., an intrinsic sensor) or as a means of relaying signals from a remote sensor to electronics that process a signal within the optical fiber (e.g., an extrinsic sensor). Fiber-optic sensors, such as intrinsic sensors, utilize optical fibers to measure temperature, strain, pressure, and/or other characteristics associated with the optical fiber.

SUMMARY

An in-line fiber-optic sensing element, a system, and methods for detecting strain using a fiber optic sensor are described that include using at least two chirped grating structures. In an implementation, an in-line fiber-optic sensing element that employs example techniques in accordance with the present disclosure includes an optically transmissive fiber including a core and an outer layer; a Fabry-Perot cavity defined by a portion of the optically transmissive fiber and the at least two chirped fiber-Bragg grating structures, where the at least two chirped grating structures are separated or partially overlap and are configured to reflect light.

In an implementation, a system includes an optically transmissive fiber; a light source configured to transmit light in the optically transmissive fiber; a circulator or coupler that separates optical signals in the optically transmissive fiber; an in-line fiber-optic sensing element including an optically transmissive fiber configured to receive light from a light source; a Fabry-Perot cavity defined by a portion of the optically transmissive fiber and at least two chirped fiber Bragg grating structures, where the at least two chirped fiber Bragg grating structures are separated or partially overlap and are configured to reflect light; a photodetector that detects light from the in-line fiber-optic sensing element; and a controller coupled to the photodetector.

In an implementation, a process for detecting strain using a fiber optic sensor includes initiating at least one wavelength-tunable laser source that transmits laser light to at least one in-line fiber-optic sensing element, where the at least one in-line fiber-optic sensing element includes at least two chirped grating structures; using at least one photodetector to detect reflected laser light from the at least one in-line fiber-optic sensing element; and using a controller to determine wavelength shift in the reflected laser light.

In an implementation, a process for detecting strain using a fiber optic sensor includes initiating a wavelength-tunable laser source that transmits laser light to an in-line fiber-optic sensing element, where the in-line fiber-optic sensing element includes at least two chirped grating structures; locking a laser wavelength onto a spectral wavelength with a specific wavelength slope; unlocking and relocking a laser wavelength onto a different spectral wavelength with a specific wavelength slope; using a photodetector to detect a change in laser light reflectance that represents a shift in spectral wavelength, where the laser light is reflected from the in-line fiber-optic sensing element; using a controller to correlate the change in laser light reflectance with a structural strain.

In an implementation, a process for reducing noise from a light source in an in-line fiber-optic sensing element system includes initiating at least one light source that transmits light; splitting the light to a sensor channel having an in-line fiber-optic sensing element with a spectral slope, where the in-line fiber-optic sensing element includes at least a grating structures, and to a reference channel including a reference element with a spectral slope; and using a controller to cancel the noise from the light source using the signal from the reference channel.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. The use of the same reference numbers in different instances in the description and the figures may indicate similar or identical items.

FIG. 16 is a graphical depiction illustrating a sensor reflection spectrum from an in-line fiber-optic sensing element, such as the in-line fiber-optic sensing element illustrated in FIGS. 2 and 3.

FIG. 17 is a graphical depiction illustrating a sensor reflection spectrum shift from an in-line fiber-optic sensing element, such as the in-line fiber-optic sensing element illustrated in FIGS. 2 and 3.

Figure 19:
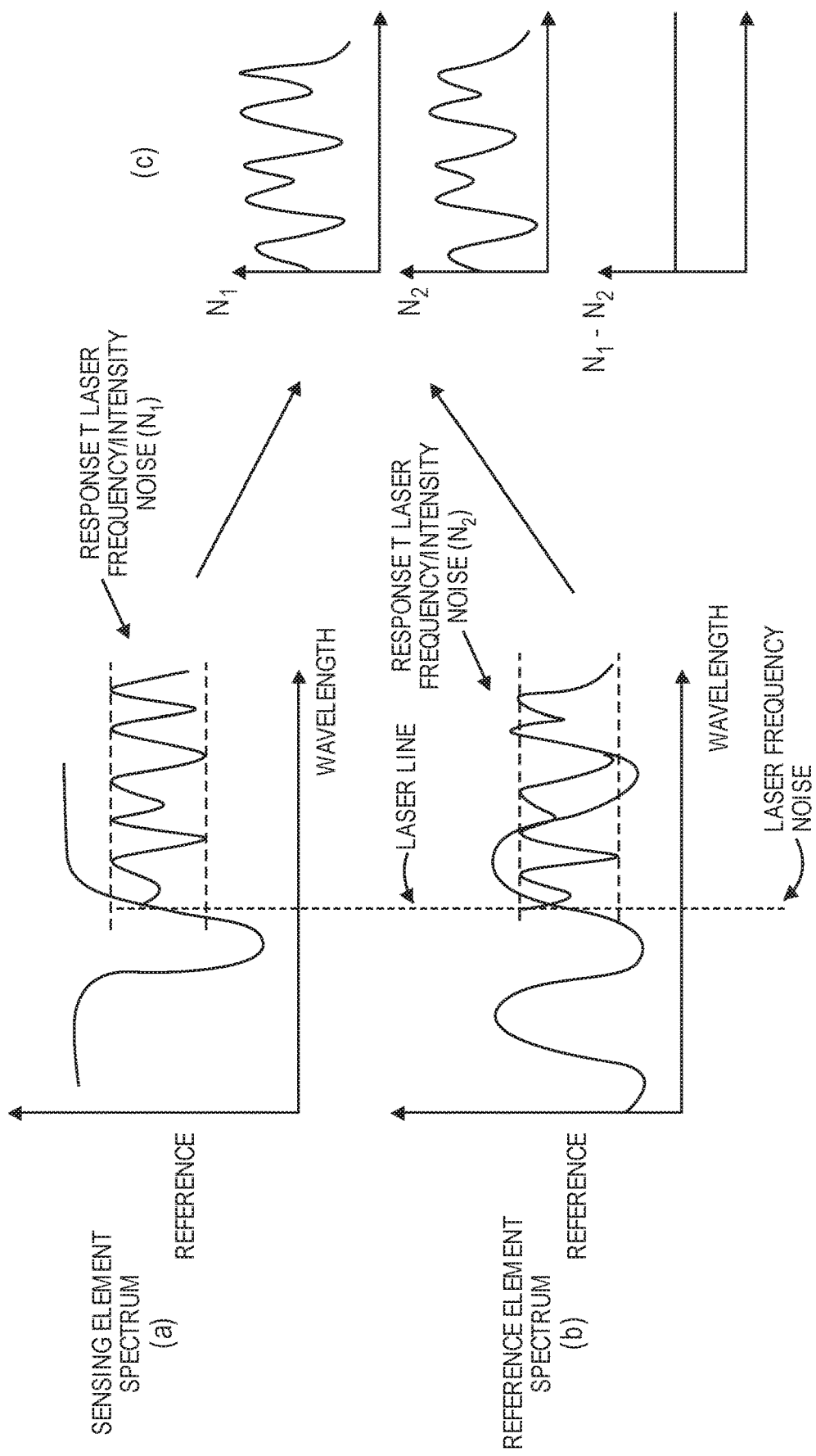

FIG. 19 includes graphical depictions illustrating exemplary spectra from an in-line fiber-optic sensing element and a reference element in accordance with an example implementation of the present disclosure.

Figure 18:
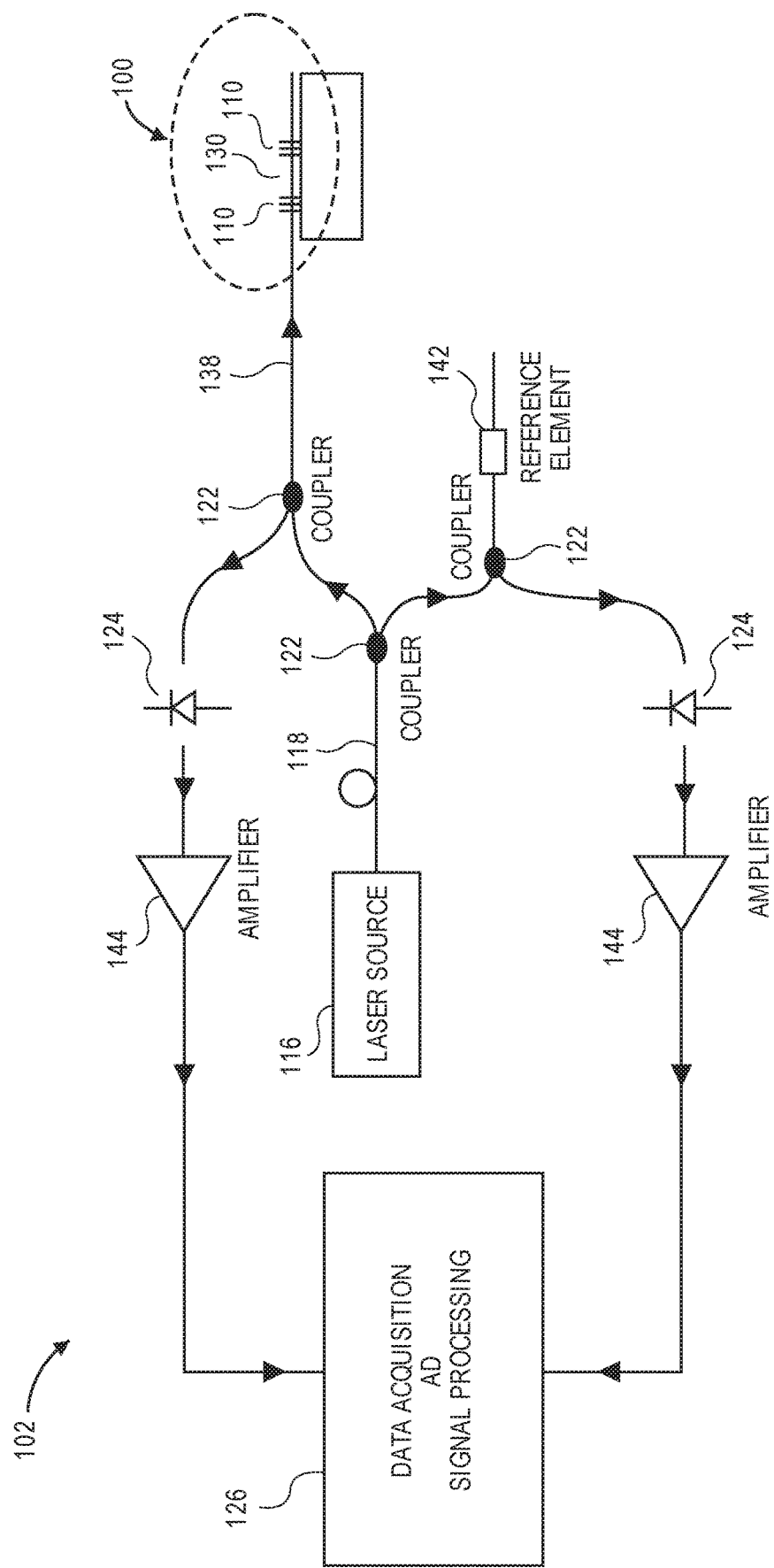
FIG. 18 is an environmental depiction illustrating an embodiment of a sensing system and in-line fiber-optic sensing element including two chirped grating structures, where the sensing system is configured to reducing noise from a light source, in accordance with an example implementation of the present disclosure.
Figure 20:
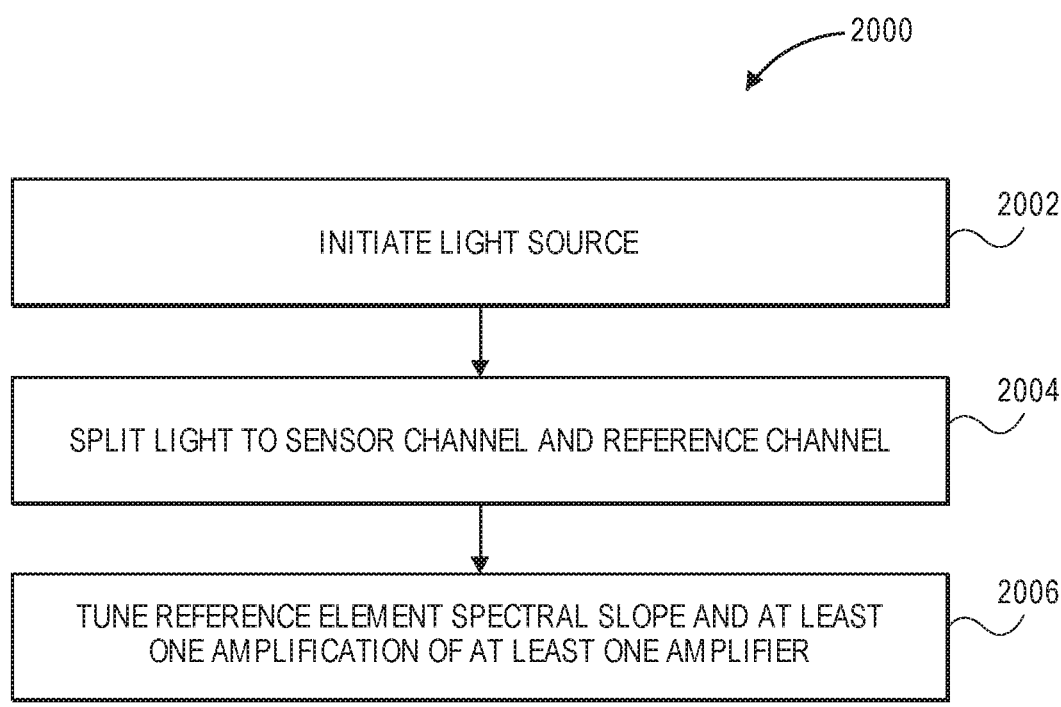

FIG. 20 is a flow diagram illustrating an example process for reducing noise from a light source in a sensing system, such as the sensing system illustrated in FIGS. 18 and 19.

DETAILED DESCRIPTION

Overview

An optical fiber can include a flexible, transparent fiber made of extruded glass (silica) or plastic. Light can be transmitted between two ends of the optical fiber, which may be used in fiber-optic communications. A fiber optic sensor uses an optical fiber either as the sensing element (e.g., an intrinsic sensor) or as a means of relaying signals from a remote sensor to electronics that process a signal within the optical fiber (e.g., an extrinsic sensor). Fiber-optic sensors, such as intrinsic sensors, utilize optical fibers to measure temperature, strain, pressure, and/or other characteristics associated with the optical fiber. For example, the optical fiber may be modified such that the characteristic to be measured modulates the intensity, phase, polarization, wavelength, and/or transit time of the light within the fiber. A portion of the modulation can be measured to determine the characteristic to be measured.

Some strain sensors include piezo electric sensors or other fiber-optic sensors. However, some of these sensors may be large in size and can be susceptible to electromagnetic energy and surges, such as lightning. Additionally, a large background signal can overwhelm some of these sensors and detection sensitivity may be reduced.

Accordingly, an in-line fiber-optic sensing element, a system, and methods for detecting strain using a fiber optic sensor are described that include using at least two chirped grating structures. In an implementation, an in-line fiber-optic sensing element that employs example techniques in accordance with the present disclosure includes an optically transmissive fiber configured to receive light from a light source; a Fabry-Perot cavity defined by a portion of the optically transmissive fiber and at least two chirped fiber Bragg grating structures, where the at least two chirped fiber Bragg grating structures are separated or partially overlap and are configured to reflect light.

In an implementation, a system includes an optically transmissive fiber; a light source configured to transmit light in the optically transmissive fiber; a circulator or a coupler that separates optical signals in the optically transmissive fiber; an in-line fiber-optic sensing element including an optically transmissive fiber configured to receive light from a light source; a Fabry-Perot cavity defined by a portion of the optically transmissive fiber and at least two chirped fiber Bragg grating structures, where the at least two chirped fiber Bragg grating structures are separated and are configured to reflect light; a photodetector that detects light from the in-line fiber-optic sensing element; and a controller coupled to the photodetector.

In an implementation, a process for detecting strain using a fiber optic sensor includes initiating a wavelength-tunable laser source that transmits laser light to an in-line fiber-optic sensing element, where the in-line fiber-optic sensing element includes at least two chirped grating structures; using a photodetector to detect reflected laser light from the in-line fiber-optic sensing element; and using a controller to measure wavelength shift in the reflected laser light.

In an implementation, a process for detecting strain using a fiber optic sensor includes initiating a wavelength-tunable laser source that transmits laser light to an in-line fiber-optic sensing element, where the in-line fiber-optic sensing element includes at least two chirped grating structures; locking a laser wavelength onto a spectral wavelength with a specific wavelength slope; using a photodetector to detect a change in laser light reflectance that represents a shift in spectral wavelength, where the laser light is reflected from the in-line fiber-optic sensing element; using a controller to correlate the change in laser light reflectance with a structural strain.

In another implementation, a process for reducing noise from a light source in an in-line fiber-optic sensing element system that employs example techniques in accordance with the present disclosure includes initiating a light source that transmits light; splitting the light to a sensor channel having an in-line fiber-optic sensing element with a spectral slope, where the in-line fiber-optic sensing element includes two chirped grating structures, and to a reference channel including a reference element with a spectral slope; and tuning a spectral slope of the reference element and at least one amplification of at least one amplifier so that laser noise from the light source causes a similar response in the sensor channel and the reference channel. When the responses of the sensor channel and the reference channel are correlated in this way, the light source noise can be cancelled out.

Example Implementations

As illustrated in FIG. 1 through FIG. 18, a sensing system 102 and methods can include and/or utilize an in-line fiber optic sensing element 100, a light source 116, a circulator or a coupler 122, a photodetector 124, and a controller 126. In embodiments, the in-line fiber optic sensing element 100 may include a bonding area 112 (e.g., disposed on an outer layer 108 of the in-line fiber optic sensing element 100) configured for coupling the in-line fiber optic sensing element 100 to a structure 114 (e.g., an aircraft, a pipeline, a building, a bridge, or a structure as part of the sensor package etc.). The bonding area 112 may include only a portion of the outer layer 108, an adhesive, and/or a coupling means, such as a fastener.

The in-line fiber optic sensing element 100 includes an optically transmissive fiber 104, a core 106, a cladding 108, and a chirped grating structure 110. In implementations, the optically transmissive fiber 104 can include a flexible, transparent fiber made of extruded glass (e.g., fused silica) or plastic. The optically transmissive fiber 104 can be configured to transmit light between the two ends of the fiber. Additionally, the optically transmissive fiber 104 may be immune to electromagnetic interference.

The optically transmissive fiber 104 can include a core 106 and/or outer layer 108. The core 106 may include a cylinder of glass and/or plastic that extends along the length of the optically transmissive fiber 104. The core 106 may be surrounded by an outer layer 108, which may include a material with a lower index of refraction than the core 106. The outer layer 108 may include a cladding of a different glass and/or plastic, a buffer layer, and/or a jacket.

In implementations, the in-line fiber optic sensing element 100 may include a Fabry-Perot cavity and two chirped grating structures 110. A Fabry-Perot cavity (or Fabry-Perot interferometer) can include two gratings and/or mirrors connected in series separated by a cavity 130, which can include a continuous segment of the optically transmissive fiber 104. A grating can include a diffraction grating, which is an optical component with a periodic structure that splits and diffracts light into multiple beams travelling in multiple directions. One example of a diffraction grating can include a distributed Bragg reflector (e.g., a fiber Bragg grating), which includes a structure with a light reflector formed with periodic variation. For example, a distributed Bragg reflector may include a periodic refractive index structure on and/or within the core 106, which results in a wavelength-specific reflector. In a specific embodiment, the grating can include two chirped grating structures 110 (e.g., chirped fiber Bragg gratings), where each chirped grating structure 110 includes a variation in the grating period. In some implementations (shown in FIG. 2, for example), the two chirped grating structures 110 may be identical or similar. The reflected wavelength changes with the grating period and broadens the reflected spectrum. A chirped fiber Bragg grating can reflect light in a specific wavelength range that shifts in response to variations in temperature, pressure, and/or strain.

Figure 1:
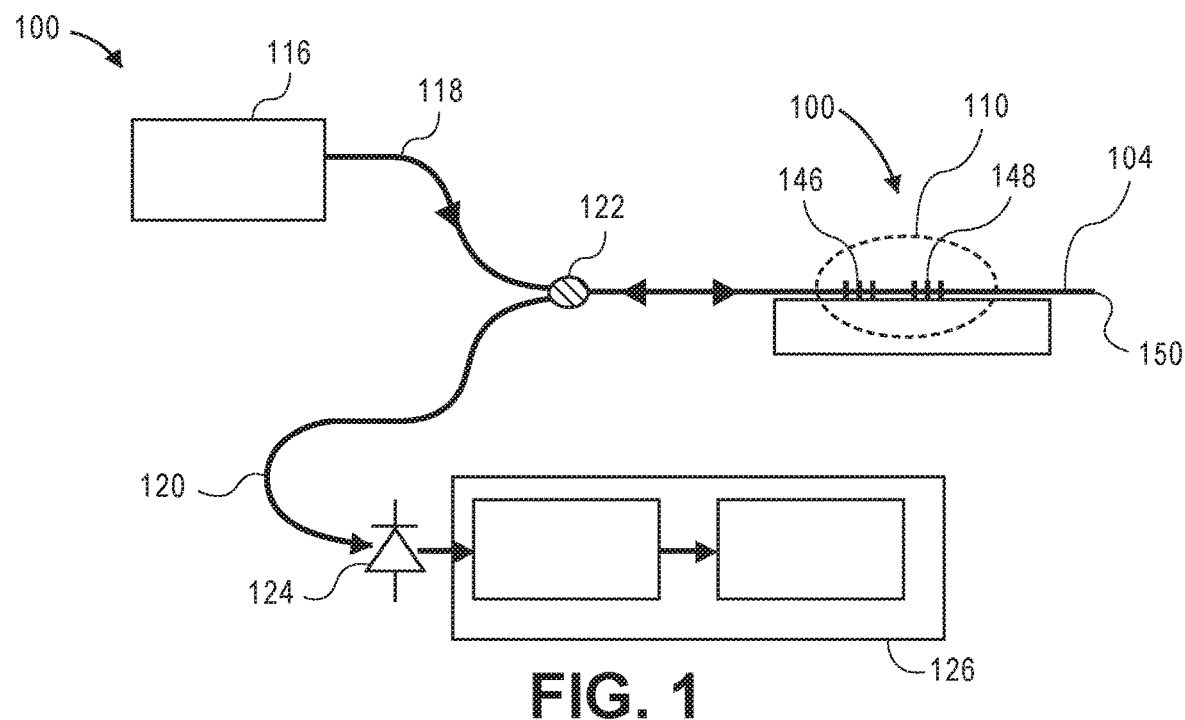
FIG. 1 is an environmental depiction illustrating an embodiment of a sensing system and in-line fiber-optic sensing element including two chirped grating structures, in accordance with an example implementation of the present disclosure.
Figure 2:
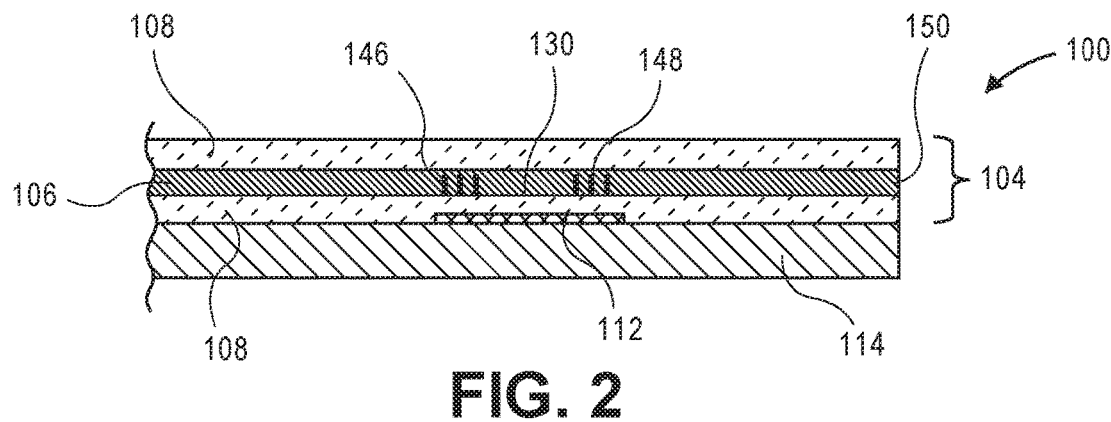
FIG. 2 is a partial cross section view illustrating an embodiment of an in-line fiber-optic sensing element including two chirped grating structures, in accordance with an example implementation of the present disclosure.
Figure 3:
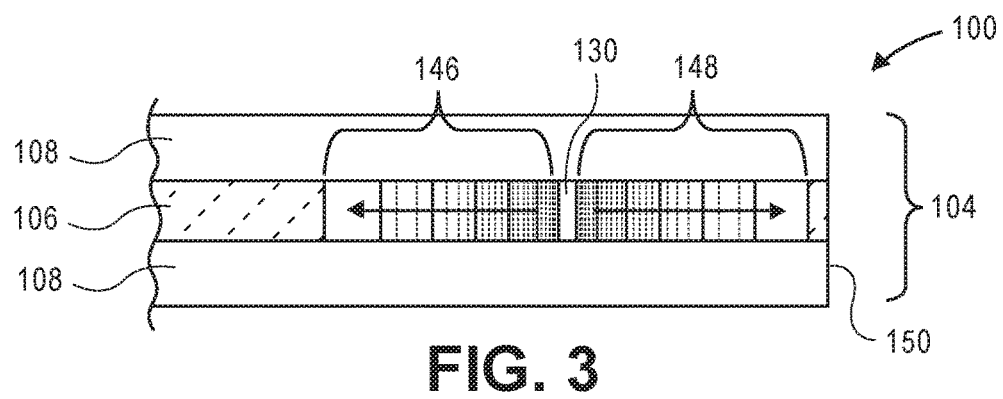
FIG. 3 is a partial cross section view illustrating an embodiment of an in-line fiber-optic sensing element including two chirped grating structures, in accordance with an example implementation of the present disclosure.
Figure 4:
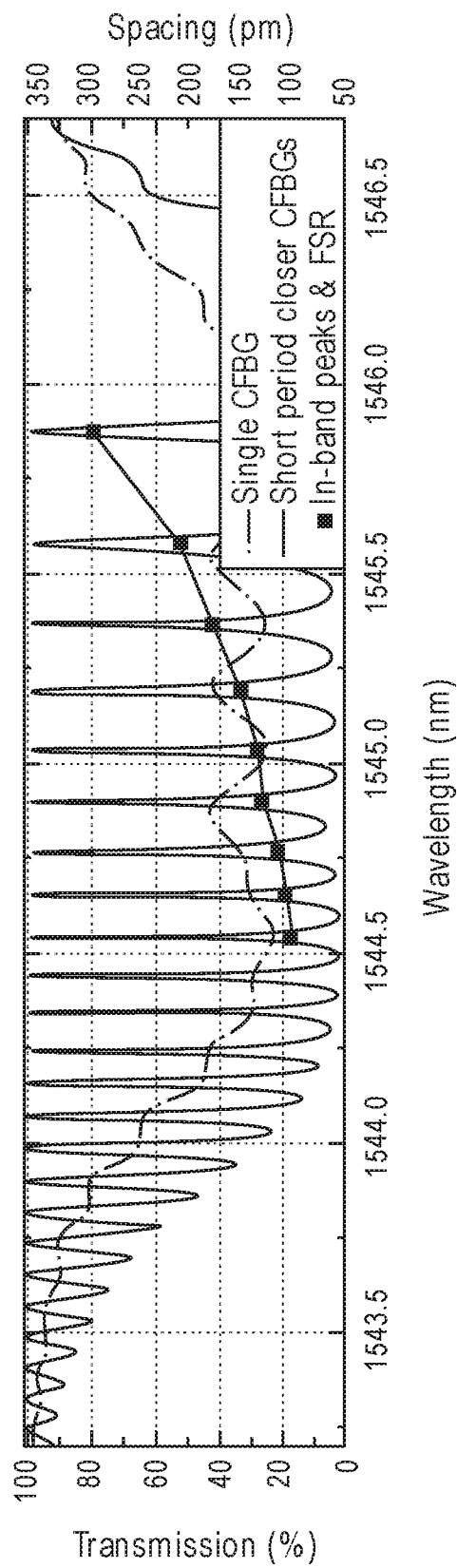
FIG. 4 is a graphical depiction illustrating a transmission spectrum of an in-line fiber-optic sensing element including two chirped grating structures, in accordance with an example implementation of the present disclosure.

In the specific embodiment illustrated in FIG. 3, in-line fiber optic sensing element 100 can include at least two chirped grating structures 110 (e.g., a chirped grating structure assembly) that are configured in opposite directions. In this embodiment, the in-line fiber optic sensing element 100 includes a first chirped fiber-Bragg grating structure 146 with a period that decreases from left to right (e.g., extending towards a cleaved end face 150 of the optically transmissive fiber 104) and a second chirped fiber-Bragg grating structure 148 with a period that increases from left to right (e.g., extending towards a cleaved end face 150 of the optically transmissive fiber 104). By arranging the two chirped grating structures 110 in this way, the separation of the spectral fringes becomes non-uniform. FIG. 4 illustrates an exemplary transmission spectrum from the in-line fiber optic sensing element 100 represented in FIG. 3. This transmission spectrum shows the separation of the neighboring fringes increases as wavelength increases for the spectral fringes between about 1544.5-1546.0 nm.

Figure 9:
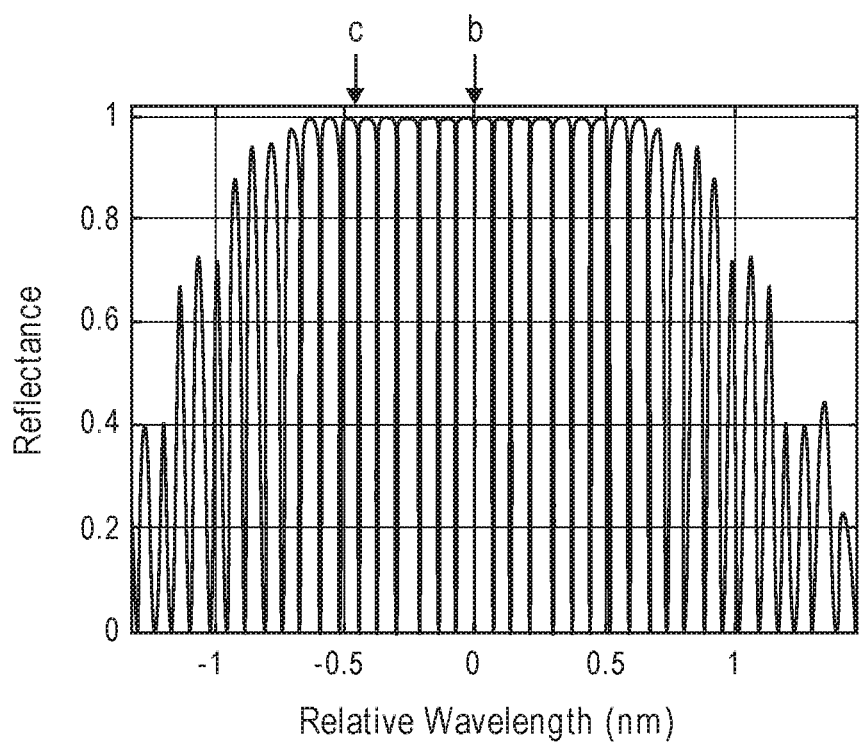
FIG. 9 is a graphical depiction illustrating a reflection spectrum from an in-line fiber-optic sensing element including two chirped grating structures, in accordance with an example implementation of the present disclosure.
Figure 10:
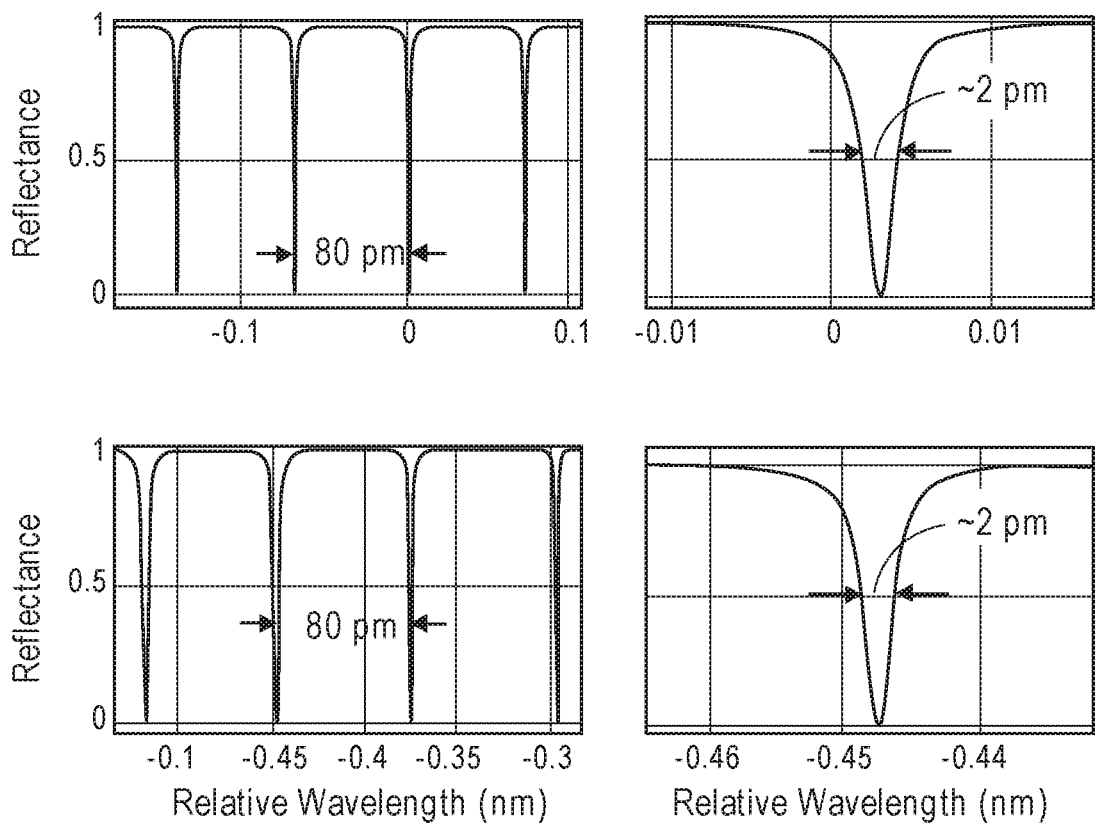
FIG. 10 is a graphical depiction illustrating a close up view of the reflection spectrum illustrated in FIG. 5, in accordance with an example implementation of the present disclosure.

FIG. 9 illustrates a reflection spectrum of an in-line fiber optic sensing element 100 formed by two chirped fiber Bragg gratings separated by a distance of 8 mm. In this specific embodiment, the parameters used for the chirped fiber Bragg gratings include a grating length of approximately 3.5 mm, a chirp rate of approximately 1.6 nm/cm, and a refractive index modification depth of approximately $6 \times 10^{-4}$. The total length of this specific in-line fiber optic sensing element 100 is approximately 15 mm. FIG. 9 shows that the reflection spectrum of the in-line fiber optic sensing element 100 features fringes within the reflection wavelength band defined by the chirped fiber Bragg gratings. FIG. 10 shows close-up views of the fringes at the center of the spectrum indicating a free-spectral range (FSR) (i.e., the spectral separation between two adjacent fringes) of ~80 pm and a 3-dB bandwidth having a fringe of ~2 pm. Due to the use of identical chirped grating structures 110 in the embodiment illustrated in FIG. 2, which achieves uniform reflectivity over a relatively broad spectral range, the FSR and the fringe bandwidth remain approximately uniform over the same spectral range. For example, FIG. 10 shows the details of the spectral fringes at the wavelengths about 0.5 nm shorter than the center wavelength of the spectrum, revealing that the FSR (~80 pm) and 3-dB bandwidth of a fringe (~2 pm) are unchanged compared to their values at the center wavelength. As discussed below, maintaining narrow fringe bandwidth and relatively constant FSR is essential for highly-sensitive dynamic strain detection sensitivity.

In implementations, transmitted light 118 can be transmitted to the in-line fiber optic sensing element 100, where multiple beams of light interfere between the chirped grating structures 110 resulting in an optical spectrum with a series of peaks and spectral notches. The wavelength positions of the peaks or spectral notches changes in relation to a physical disturbance of the chirped grating structure 110 and/or the in-line fiber optic sensing element 100. Thus, any changes in the distance between the chirped grating structures 110 and/or changes (e.g., grating pitch) within the chirped grating structures 110 can produce a modulation of the output signal current, which can be sinusoidal. Real-time monitoring of spectral peak and notch shifts can yield information regarding structure strain and micro-displacement.

In implementations, the sensing system 102 includes a light source 116 for transmitting light to the in-line fiber optic sensing element 100. In the embodiment shown in FIG. 1, light source 116 includes a wavelength-tunable laser, such as a semiconductor distributed feedback (DFB) laser or an external-cavity tunable diode laser. In the embodiment, shown in FIG. 5, the light source 116 includes a laser diode.

The sensing system 102 may include a circulator or a coupler 122, which can include a fiber-optic component used to separate optical signals in an optically transmissive fiber 104. In implementations, a circulator 122 can direct transmitted light 118 to and reflected light 120 from an in-line fiber-optic sensing element 100.

The sensing system 102 can include a photodetector 124 coupled to the optically transmissive fiber 104 and a controller 126. In implementations, a photodetector 124 can include a sensor configured to detect reflected light 120 from the optically transmissive fiber 104 and in-line fiber-optic sensing element 100. In a specific embodiment, the photodetector 124 may include a high-speed photodetector.

Figure 8:
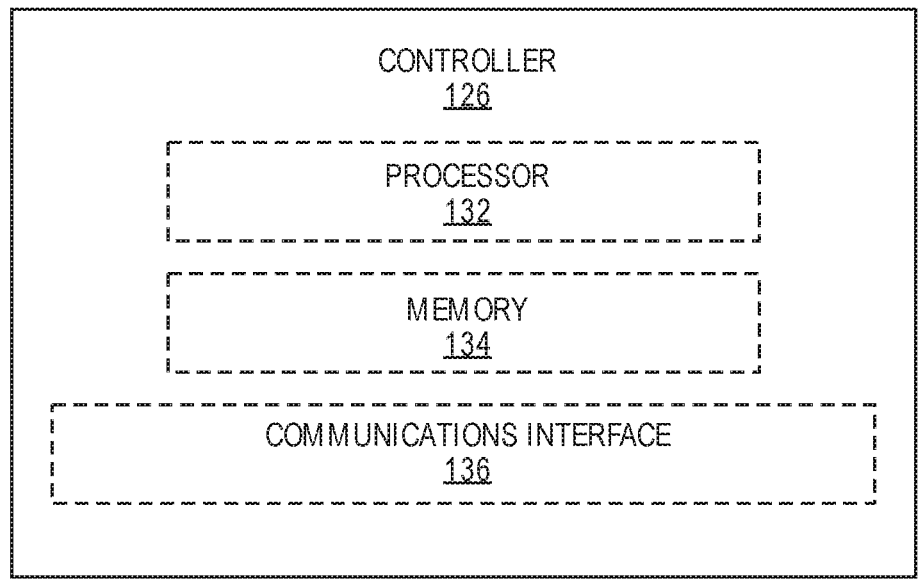
FIG. 8 is an environmental depiction illustrating an embodiment of a controller used in the sensing system, in accordance with an example implementation of the present disclosure.

FIG. 8 illustrates a controller 126 that is configured to determine structural strain using an in-line fiber-optic sensing element 100. The controller 126 may be configured in a variety of ways. The controller 126 is illustrated as including a processor 132, a memory 134, and a communication interface 136. The processor 132 provides processing functionality for the sensing system 100 and may include any number of processors, micro-controllers, or other processing systems, and resident or external memory for storing data and other information accessed or generated by the sensing system 100. The processor 132 may execute one or more software programs that implement the techniques and modules described herein. The processor 132 is not limited by the materials from which it is formed or the processing mechanisms employed therein and, as such, may be implemented via semiconductor(s) and/or transistors (e.g., electronic integrated circuits (ICs)), and so forth.

The memory 134 is an example of a non-transitory computer storage device that provides storage functionality to store various data associated with the operation of the sensing system 102, such as the software program and code segments mentioned above, computer instructions, and/or other data to instruct the processor 132 and other elements of the sensing system 102 to perform the techniques described herein. Although a single memory 134 is shown, a wide variety of types and combinations of memory may be employed. The memory 134 may be integral with the processor 132, stand-alone memory, or a combination of both. The memory may include, for example, removable and non-removable memory elements such as RAM, ROM, Flash (e.g., SD Card, mini-SD card, micro-SD Card), magnetic, optical, USB memory devices, and so forth.

The communications interface 136 is operatively configured to communicate with components of the sensing system 100. For example, the communications interface 136 can be configured to transmit data for storage in the sensing system 100, retrieve data from storage in the sensing system 100, and so forth. The communications interface 136 is also communicatively coupled with the processor 132 to facilitate data transfer between components of the sensing system 100 and the processor 132 (e.g., for communicating inputs to the processor 132 received from a device communicatively coupled with the sensing system 100). It should be noted that while the communications interface 136 is described as a component of sensing system 100, one or more components of the communications interface 136 can be implemented as external components communicatively coupled to the sensing system 100 via a wired and/or wireless connection. The sensing system 100 can also comprise and/or connect to one or more input/output (I/O) devices (e.g., via the communications interface 136) including, but not necessarily limited to a display, a mouse, a touchpad, a keyboard, and so on.

The communications interface 136 and/or the processor 132 can be configured to communicate with a variety of different networks including, but not necessarily limited to: a wide-area cellular telephone network, such as a 3G cellular network, a 4G cellular network, or a global system for mobile communications (GSM) network; a wireless computer communications network, such as a WiFi network (e.g., a wireless local area network (WLAN) operated using IEEE 802.11 network standards); an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to be restrictive of the present disclosure. Further, the communications interface 136 can be configured to communicate with a single network or multiple networks across different access points.

Figure 5:
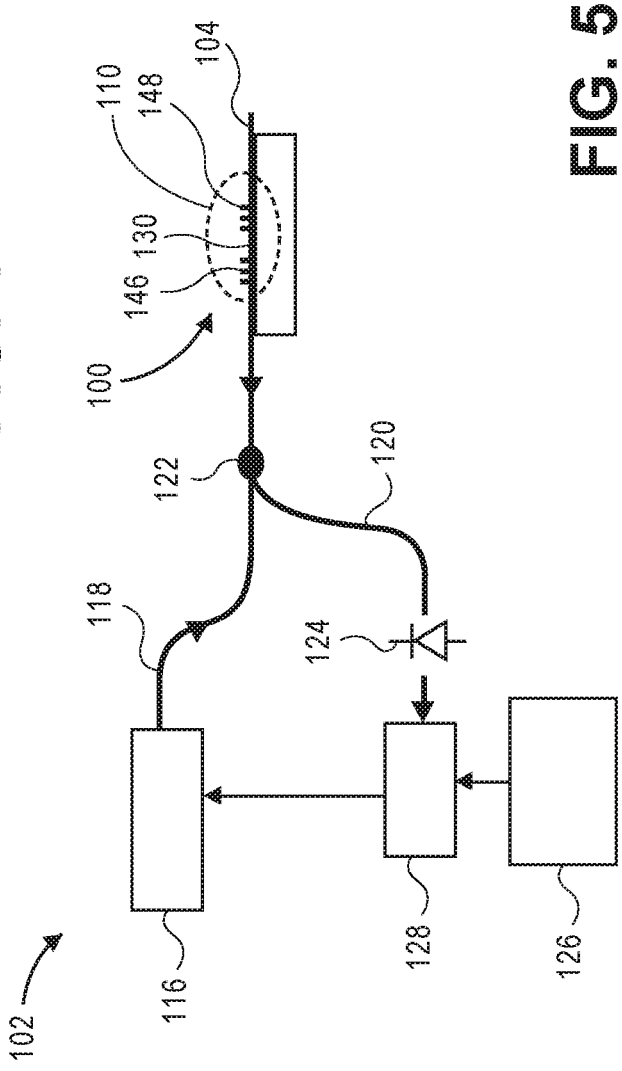
FIG. 5 is an environmental depiction illustrating an embodiment of a sensing system and in-line fiber-optic sensing element including two chirped grating structures, in accordance with an example implementation of the present disclosure.

In some embodiments, as illustrated in FIG. 5, the sensing system 102 may include a servo 128. A servo 128 can include a servomechanism for providing control of the light source 116 (e.g., laser diode) using feedback from the controller 126 and/or the photodiode 124.

Figure 6:
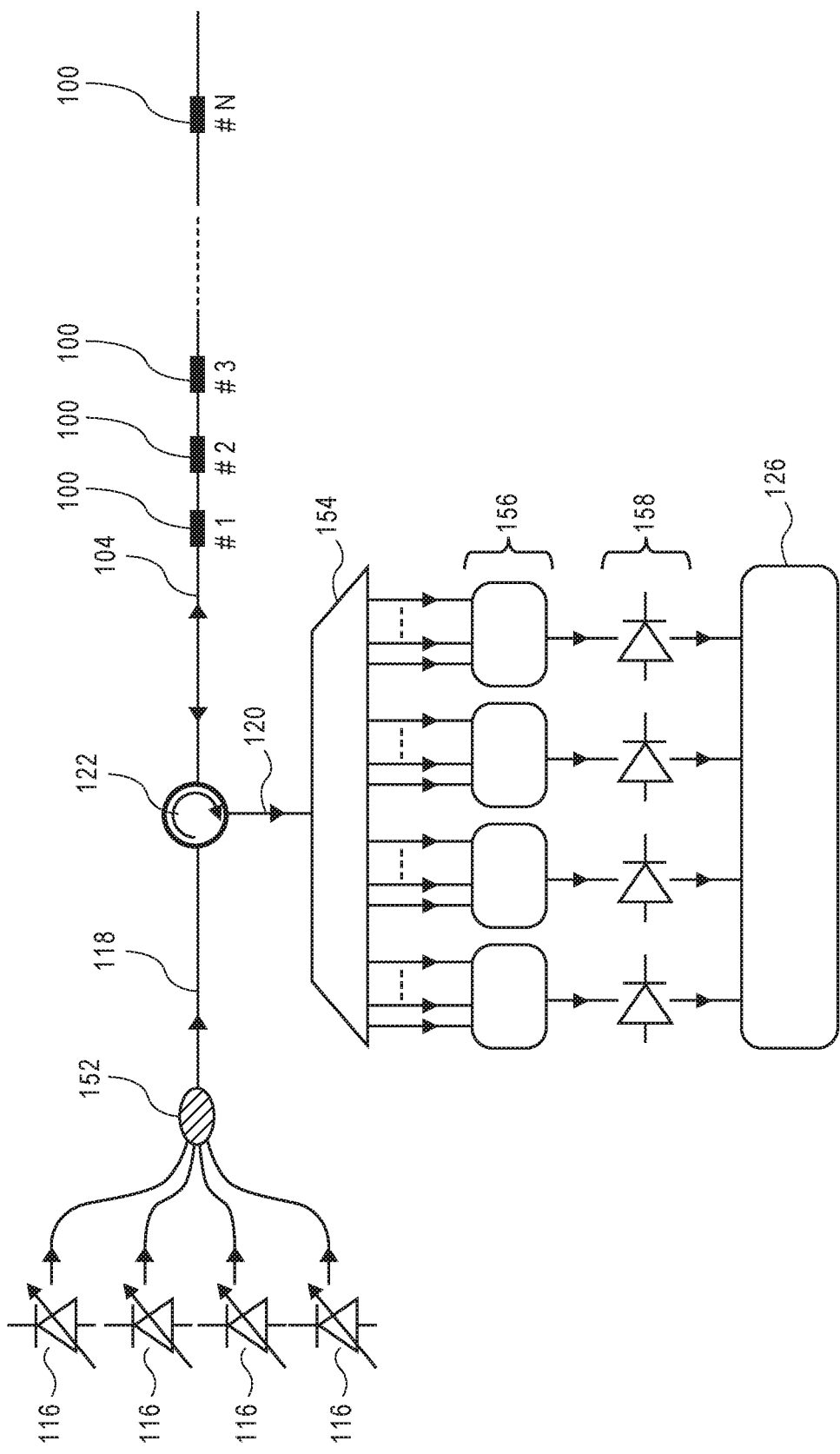
FIG. 6 is an environmental depiction illustrating an embodiment of a sensing system and in-line fiber-optic sensing element including two chirped grating structures, in accordance with an example implementation of the present disclosure.

FIG. 6 illustrates a specific embodiment of a sensing system 102 and an in-line fiber-optic sensing element 100 that can identify two neighboring spectral fringes of interest. The specific sensing system 102 depicted in FIG. 6 includes multiple light sources 116 (four light sources 116 are shown), a coupler 152 configured to optically couple the light sources 116 to an optically transmissive fiber 104 and at least one in-line fiber-optic sensing element 100 (four are illustrated). Additionally, the in-line fiber-optic sensing element 100 includes a circulator 122 that couples the optically transmissive fiber 104 to a wavelength-division-multiplexer/demultiplexer (WDM) 154, an optical switch assembly 156, a photodetector assembly 158, and a controller 126. The transmitted light 118 (e.g., laser light) output from all four light sources 116 is combined into a single optically transmissive fiber 104 using a 4×1 fiber-optic coupler 152 and then guided to the in-line fiber-optic sensing elements 100 through a fiber-optic circulator 122. Through the circulator 122, the reflected light 120 from the in-line fiber-optic sensing elements 100 is directed to the WDM 154 where respective reflected light 120 from different light sources 116 is routed to different output ports of the WDM 154 according to their wavelengths. An optical switch assembly 156 (four switches are shown in this embodiment) is used to route the light from a specific WDM 154 output port to a photodetector assembly 158 (four photodetectors are shown). Finally the signals from the four photodetectors, each corresponding to a respective light source 116, are sampled, digitized, and processed by controller 126. Because each of the light sources 116 can be tuned to several wavelength grids of the WDM 154, their wavelength can be configured to demodulate different sets of four in-line fiber-optic sensing elements 100 from a much larger number of in-line fiber-optic sensing elements 100 multiplexed on the optically transmissive fiber 104. Each of the in-line fiber-optic sensing elements 100 only occupies a finite optical wavelength bandwidth determined by the chirped grating structures 110 in each in-line fiber-optic sensing element 100; therefore, multiple in-line fiber-optic sensing elements 100 can be multiplexed in a single optically transmissive fiber 104 in the wavelength domain. In this embodiment, a large number of in-line fiber-optic sensing elements 100 can be multiplexed in an optically transmissive fiber 104 but only a few light sources 116 (e.g., lasers) are employed to demodulate the in-line fiber-optic sensing elements 100. Each of the light sources 116 can be tuned in a large wavelength and demodulate a single in-line fiber-optic sensing element 100 at any given time. However, due to the tunability of the light sources 116 in a wide wavelength range, they can be configured or reconfigured to demodulate any group of the in-line fiber-optic sensing elements 100 multiplexed on the optically transmissive fiber 104.

Figure 7:
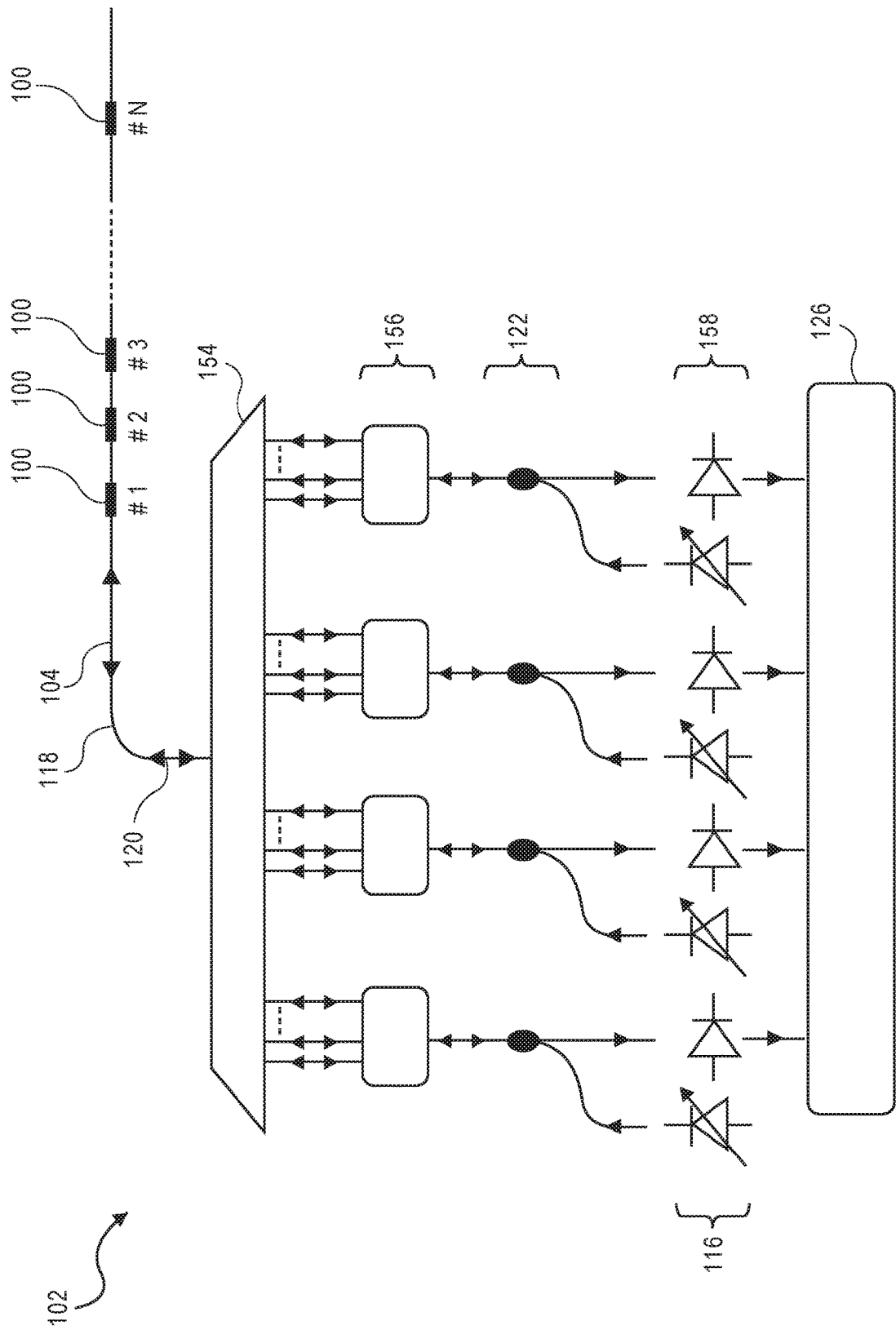
FIG. 7 is an environmental depiction illustrating an embodiment of a sensing system and in-line fiber-optic sensing element including two chirped grating structures, in accordance with an example implementation of the present disclosure.

FIG. 7 illustrates another specific embodiment of a four-channel sensor system 102 configuration. In this specific embodiment, transmitted light 118 from the light sources 116 is transmitted to the in-line fiber-optic sensing elements 100 and the reflected light 120 is collected by the same WDM 154 and optical switch assembly 156 using a fiber-optic coupler 152 and/or circulator 122.

In the specific embodiment shown in FIGS. 16 and 17, a reference channel 140 with a reference element 142 whose output is correlated to light source noise is correlated to a sensor channel 138 so that it can be used to partially cancel noise from the sensor channel. In this embodiment, the sensing system 102 can include a light source 116, a sensor channel 138 corresponding to an in-line fiber-optic sensing element 100, and an amplifier 144 disposed between the sensor channel 138 and a controller 126. Additionally, the sensing system 102 can include a reference channel 140 corresponding to a reference element 142 (e.g., an in-line fiber-optic sensing element not coupled to a structure 114) and an amplifier 144 disposed between the reference element 142 and the controller 126.

Light sources (e.g., light source 116) typically have frequency noise and intensity noise. Frequency noise can include light frequency fluctuations, while intensity noise can include the light laser intensity fluctuation. In implementations, intensity noise can be directly detected by the photodetector 124 of the sensing system 102. When a laser wavelength is located in a spectral slope of the in-line fiber-optic sensing element 100, the frequency noise can be converted to fluctuations in the light power delivered to the photodetector 124, which becomes part of the noise of the sensing system 102.

Example Processes

Figure 11:
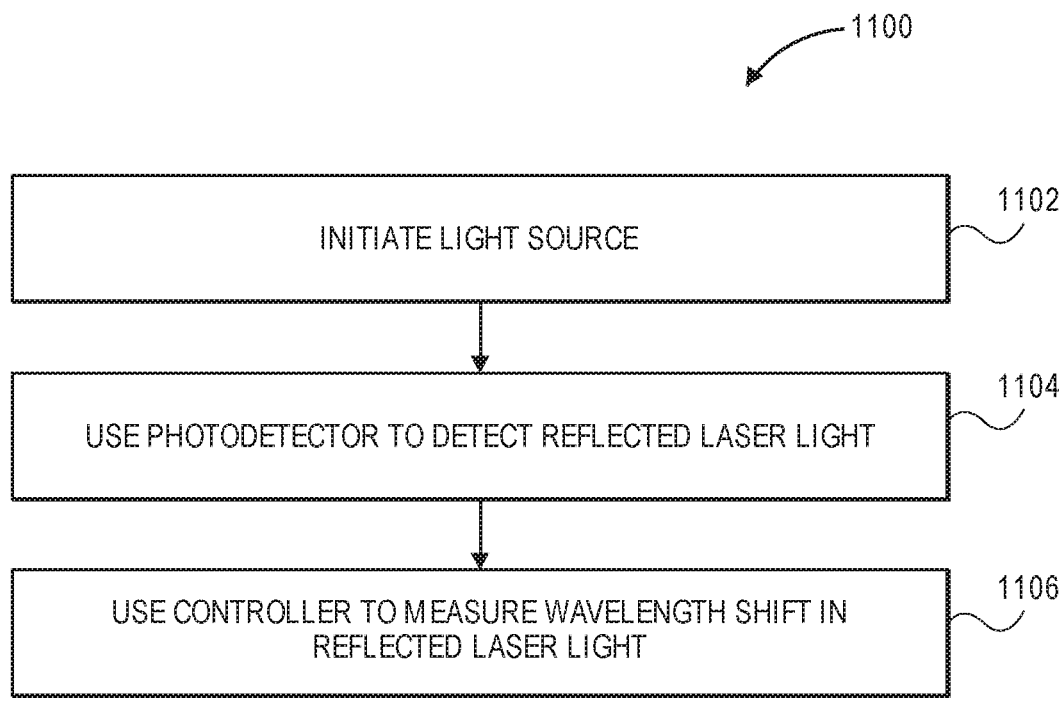
FIG. 11 is a flow diagram illustrating an example process for detecting strain using a fiber optic sensor, such as the sensing system and in-line fiber-optic sensing element illustrated in FIGS. 1 through 3, 5, and 18.

FIGS. 11 and 18 illustrate example processes that employ techniques for using the sensing system 102 and/or the in-line fiber-optic sensing element 100 shown in FIGS. 1 through 3, 6, 7, 8, and 16.

FIG. 11 illustrates a process using a scanning laser to detect a spectral shift. First, a light source is initiated (Block 702). When strain signals impinge onto an in-line fiber-optic sensing element 100, the strain signals cause spectral shifts of the fringes. Structural strain detection can be achieved by detecting the spectral shifts with high resolution of the reflectance of reflected light 120 reflected from an in-line fiber optic sensing element 100 using light source 116 (e.g., a wavelength-tunable laser source).

Figure 12:
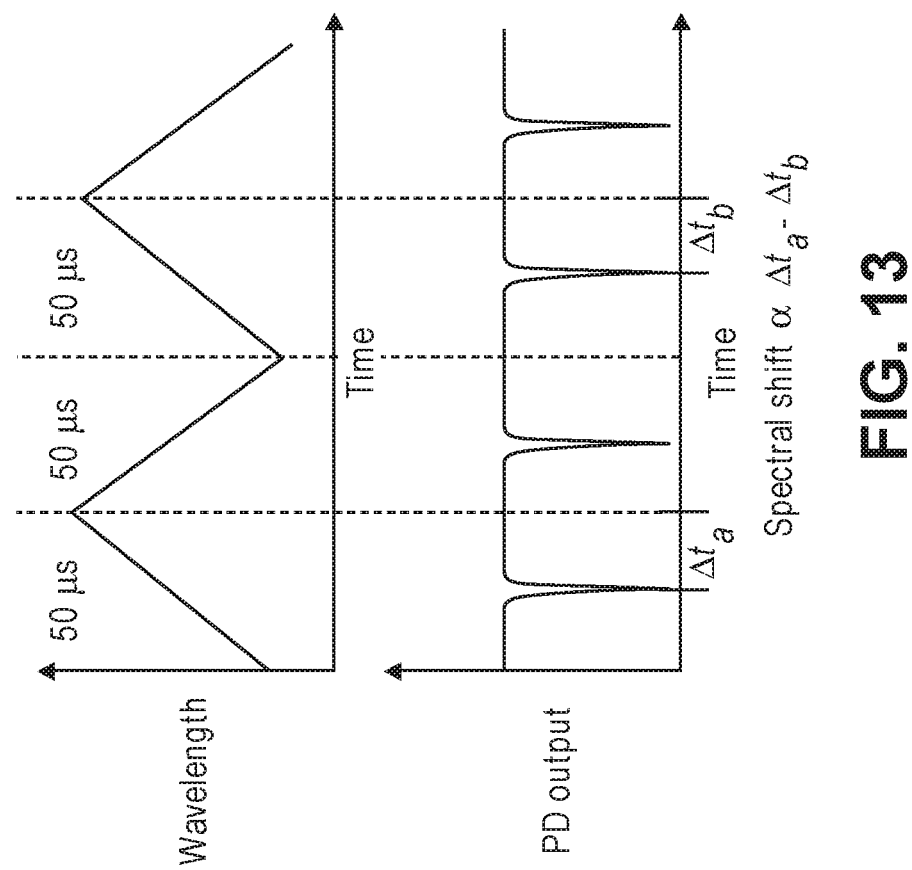
FIG. 12 is a graphical depiction illustrating a sensor reflection spectrum from an in-line fiber-optic sensing element, such as the in-line fiber-optic sensing element illustrated in FIGS. 2 and 3.

FIG. 12 illustrates an example depiction of demodulation of an in-line fiber-optic sensing element 100. In FIG. 12, an exemplary reflection spectrum is shown where the wavelength of the light source 116 is rapidly swept with a speed on the order of 10 kHz over a small spectral range on the order of 100 pm. The sweeping maps the laser wavelength to the time relative to the sweeping cycles. A photodetector then detects light reflected from the in-line fiber-optic sensing element (Block 704). A spectral fringe of the in-line fiber-optic sensing element 100 is included in the sweeping wavelength range, and the reflected laser intensity is detected and recorded in the time domain by a photodetector 124.

Figure 13:
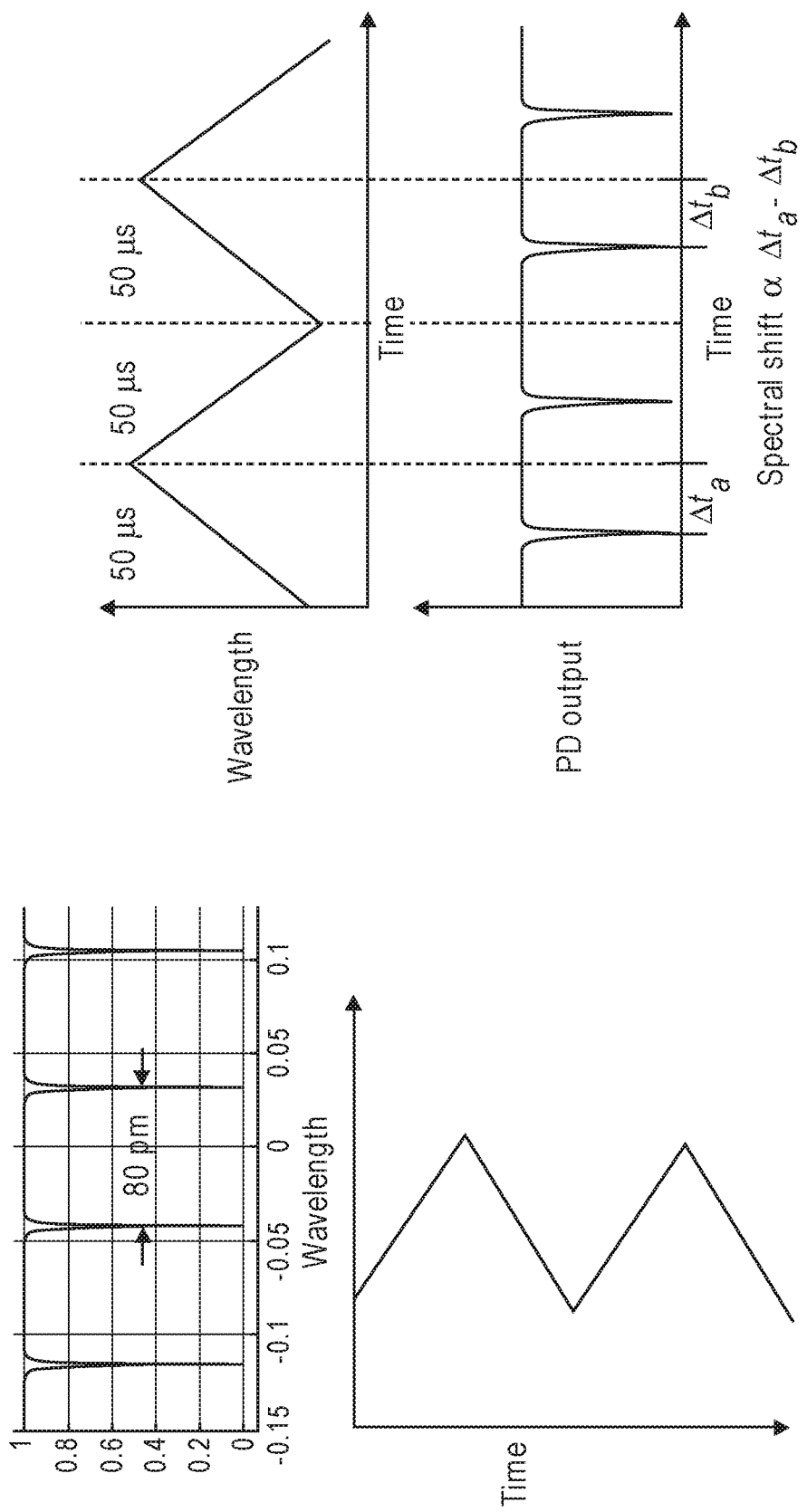
FIG. 13 is a graphical depiction illustrating a time domain signal from a photodetector and sensing system relative to a laser scanning wavelength, such as the photodetector and sensing system illustrated in FIGS. 1 through 3, 5, and 18.

As shown in FIG. 13, the time-domain waveforms corresponding to both the "ramp up" and "ramp down" slopes in a sweeping cycle have the same shape as the spectrum of the in-line fiber-optic sensing element 100, and the spectral position of the fringe is mapped to the timing of the waveform dips relative to the sweeping cycle. In a specific embodiment using FIG. 13 as an example, the laser wavelength is swept with a frequency of 10 kHz with the waveform from the 1st and 2nd wavelength "ramp up" slopes separated by 50 μs (or a sweeping cycle). Then, a wavelength shift in reflected laser light can be measured using a controller (Block 706). From the time-domain signals of the photodetector 124 output and the sweeping signal, the timing of the waveform notches relative to the cycle of the sweeping triangle waveform (e.g., $\Delta t_a$ and $\Delta t_b$) can be measured. The spectral shift of the fringe during the 100 μs period, caused by either strain signal, impact, or thermally/mechanically-induced strains upon the structure 114, is proportional to the differences between $\Delta t_a$ and $\Delta t_b$ (e.g., $\Delta t_a - \Delta t_b$). Thus, the strain detection can be achieved by using the controller 126 to analyze the time-domain signal. Detection sensitivity may be determined by the accuracy in the determining timing of the waveform notch relative to the sweeping cycles.

Figure 14:
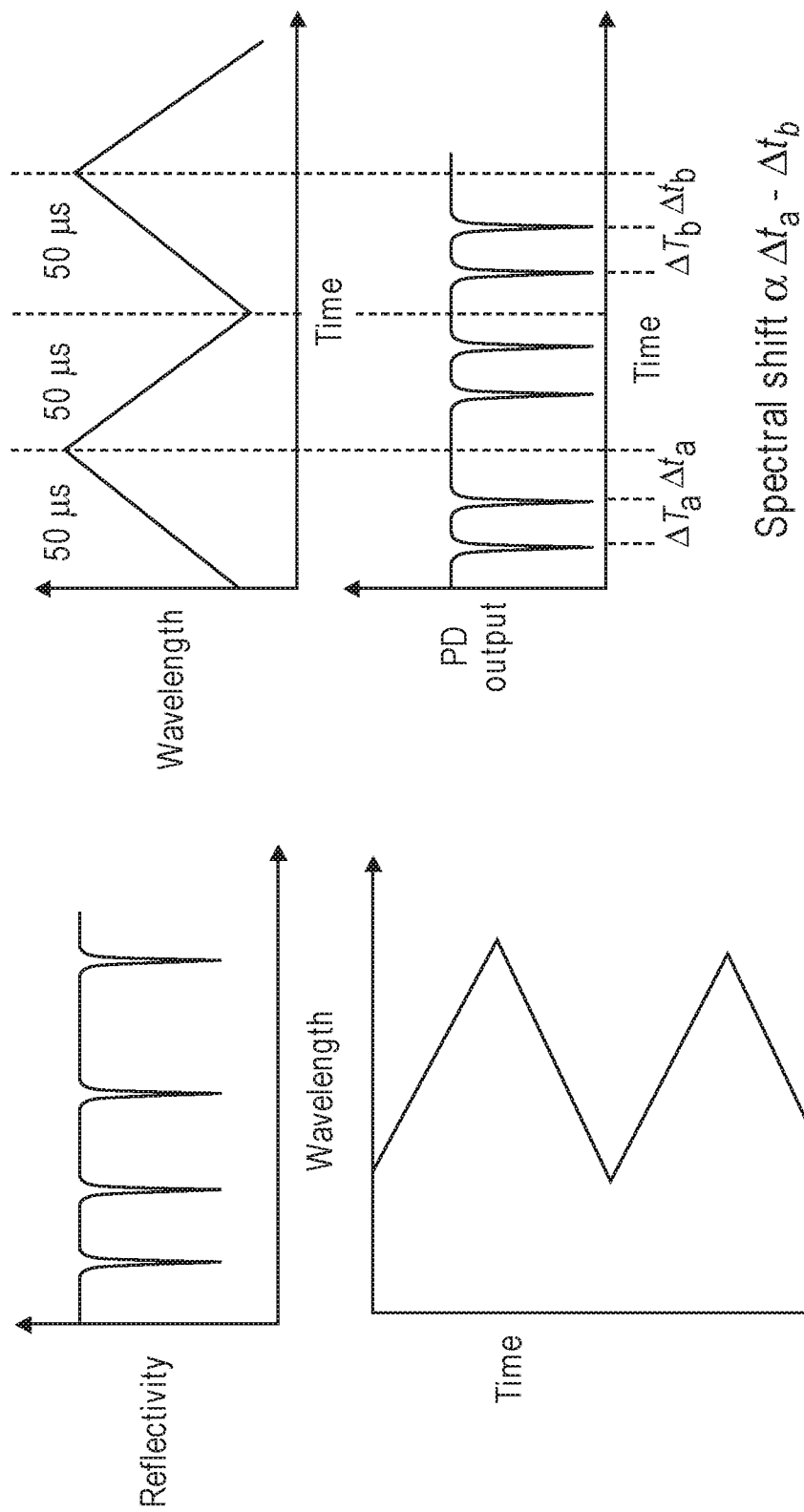
FIG. 14 is a graphical depiction illustrating a sensor reflection spectrum from an in-line fiber-optic sensing element, such as the in-line fiber-optic sensing element illustrated in FIGS. 2 and 3.

FIG. 14 illustrates an example depiction of demodulation of an in-line fiber-optic sensing element 100 for the specific case that the grating structure 110 consists of two opposite chirped fiber Bragg gratings illustrated in FIG. 3. The reflection or transmission spectrum exhibits a series of notches or peaks with increasing or decreasing spacing as illustrated in FIG. 4. In FIG. 12, the light source 116 is rapidly swept with a speed on the order of 10 kHz over a spectral range that can cover at least two spectral fringes of the in-line fiber-optic sensing element 100.

Figure 15:
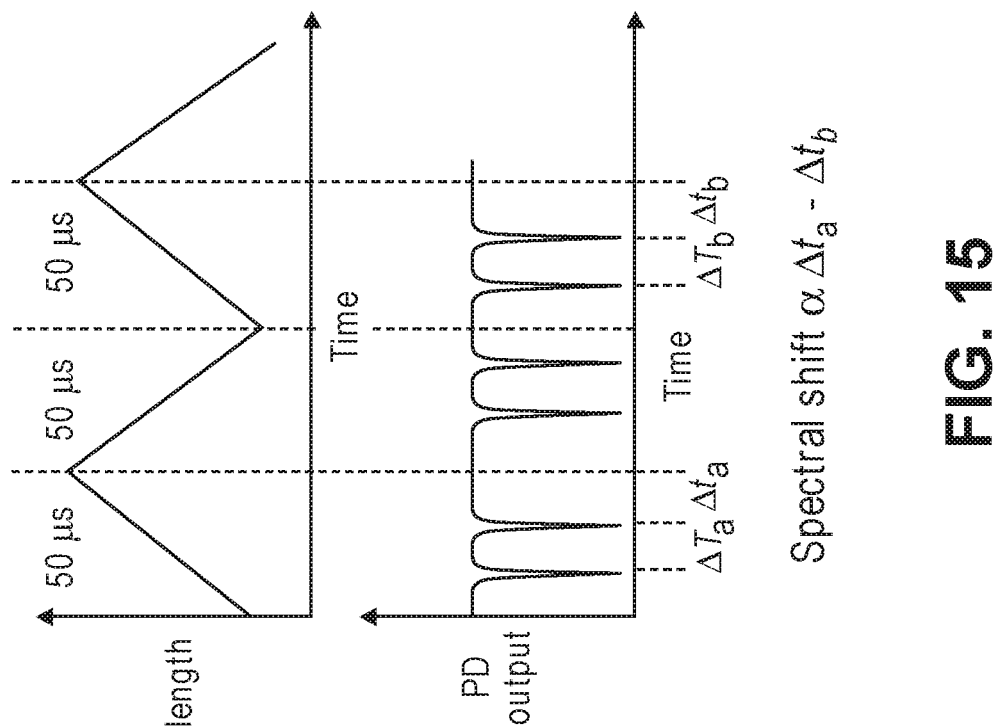
FIG. 15 is a graphical depiction illustrating a time domain signal from a photodetector and sensing system relative to a laser scanning wavelength, such as the photodetector and sensing system illustrated in FIGS. 1 through 3, 5, and 18.

As shown in FIG. 15, because the wavelength sweeping range covers at least two spectral fringes, the spacing between the two fringes can be measured. In a specific embodiment using FIG. 15 as an example, from the time-domain signals of the photodetector 124 output and the sweeping signal, the timing of the waveform notches relative to the cycle of the sweeping triangle waveform (e.g., $\Delta_{ta}$ and $\Delta_{tb}$) and the time spacing of the waveform notches (e.g., $\Delta T_a$ and $\Delta T_b$) can be measured. The time spacing of the waveform notches can be mapped to the wavelength spacing of the spectral notches of the sensing element 110. Because each pair of neighboring spectral notches of the sensing element 110 has unique spacing, the spectral notches can be identified.

This process for dynamic strain detection can be self-adaptive to quasi-static background strain. For example, large quasi-static background strain may slowly move a particular spectral fringe out of the sweeping wavelength range. However, one of the adjacent fringes moves into the sweeping wavelength range that can be used for strain detection as long as the wavelength sweeping range (e.g., ~100 pm) is larger than the free-spectral range of the reflection spectrum of the in-line fiber-optic sensing element 100. The wavelength tuning range and the free-spectral range may be configured so that at least one spectral fringe resides in the wavelength tuning range at any time so that strain detection can be performed continuously and without a dead zone.

In implementations, a narrower notch in the time-domain waveform can lead to better accuracy in obtaining the timing information of the notch. The use of chirped grating structures 110 in the in-line fiber-optic sensing element 100 ensures that a highly accurate timing measurement is obtained in a broad wavelength range. For example, an in-line fiber-optic sensing element 100 with the reflection spectrum illustrated in FIG. 9 can maintain narrow spectral fringes (e.g., <~2 pm) for a spectral range of approximately 1 nm (±0.5 nm), indicating that highly sensitive strain detection can be achieved even for a quasi-static range of ~1000με.

A process for detecting and measuring strain can include locking a laser wavelength on a spectrum wavelength slope and measuring a change in power from which a wavelength shift can be inferred. First, a light source is initiated (Block 1002). The in-line fiber-optic sensing element 100 includes a pair of grating structures (e.g., fiber Bragg gratings, chirped fiber Bragg gratings) so that the reflection spectrum of the in-line fiber-optic sensing element 100 features multiple narrow notches separated by a small wavelength range. In implementations, the light source 116 can include, for example, a distributed feedback laser diode (DFB). It is contemplated that other types of lasers may be used. The wavelength of a DFB laser diode or other types of lasers can be tuned with high speed in a small range that is slightly larger than the interval of the spectral notches.

The laser wavelength can be locked onto a specific spectral wavelength of the reflection spectrum (Block 1004). In the embodiment shown in FIG. 16, the light source 116 (e.g., laser) can be locked to one of the spectral notches within its tuning range for high-sensitivity dynamic strain measurement. Once the spectral notch shifts out of the tuning range (due to the low-frequency large background strain), another spectral notch will move in and the laser can be quickly tuned to that notch and locked at its slope, which is shown in FIG. 17. As a result, the laser will remain locked to the spectral slope of a spectral notch most of the time regardless of the background strain and high sensitivity dynamic strain measurement can be achieved, even under dynamic large strains. A photodetector can detect a change in the laser light reflectance (Block 1006). Then, the controller can correlate a change in laser light reflectance with a structural strain (Block 1008).

FIG. 20 illustrates an implementation of a method for reducing noise from a light source. First, a light source for transmitting light is initiated (Block 1502). In implementations, the light source 116 can include a laser source, such as a wavelength tunable laser, such as a distributed feedback diode laser. Then, the transmitted light is split into a sensor channel and a reference channel (Block 1504). The light from the light source 116 is split into two channels, the sensor channel 138 and the reference channel 140. In some embodiments, the sensor channel 138 configuration may be similar to the sensing system 102 illustrated in FIG. 5, where the laser (e.g., from light source 116) is locked to a spectral wavelength of sensing element 100 for strain sensing. The reference channel 140 can contain a reference element 142 whose spectrum also features slopes. Then, a spectral slope of the reference channel and at least one amplification of at least one amplifier is tuned (Block 1506). The spectrum of the reference element 142 can be tunable so that a wavelength with a specific slope can be locked to the laser wavelength. The spectral slope of the reference element 142 and the amplifications of amplifiers 144 can be tuned so that the laser noise (e.g., intensity noise and frequency noise) from light source 116 causes similar responses to both the sensor channel 138 and the reference channel 140, as schematically shown in FIGS. 17 (*a*) and (*b*). In this case, the responses of the sensor channel 138 and the reference channel 140 to laser noise from light source 116 become correlated, which cancels the laser noise. In a specific embodiment, if the in-line fiber-optic sensing element 100 and the reference element 142 have identical spectrum and the rest of the sensor channel 138 and reference channel 140 are identical, the responses of the sensor channel 138 and reference channel 140 to noise will also be identical (e.g., N1 and N2 as shown in FIG. 19 (*c*)). Thus, the laser noise can be canceled by N1−N2. The strain being measured in this method for reducing laser noise may generally not be coupled to the reference element 142 (e.g., for example, the reference element 142 is not installed on and/or coupled to the structure 114 being measured) so that the reference channel 140 does not respond to the strain signal being measured. As a result, this method cancels the noise and does not affect the signal.

The noise cancellation can also be done digitally using a controller. In this case, the signals from the senor channel and reference channels are sampled and digitalized. The controller can digitally process the signal data to find the correlation of the noises. Following is an example data processing for noise cancelation:
The output from the sensor channel contains both the signal and noise and can be expressed as $$C_1(t)=S(t)+N(t) \qquad (1)$$

where S(t) and N(t) are, respectively, the signal and the noise, and they are discrete data points after sampling and digitalization by the oscilloscope and passing a digital filter (e.g., a 500 kHz low-pass digital filter can be used). The output from the reference channel has only noise, which differs from the noise term in Eq. (1) by a coefficient α to account for the different responses of the two channels:

$$C_2(t)=\alpha N(t) \qquad (2)$$

Again, with the assumption of slow variations in the channel responses, α can be considered as a constant within the detection bandwidth of the system. In addition, it has been assumed in Eq. (2) that there is no time delay between the noise responses from the two channels. To remove the noise, the coefficient α in Eq. (2) should be determined. Note that S(t) and N(t) are two zero-mean and uncorrelated processes or $\overline{S(t)}=0$, $\overline{N(t)}=0$, and $\overline{S(t)N(t)}=0$. Then the mean of the product $C_1(t)C_2(t)$ is given by $$\overline{C_1(t)C_2(t)}=\alpha\overline{N^2(t)} \qquad (3)$$

From Eq. (2), we have $\overline{N^2(t)}=\overline{C_2^2(t)}/\alpha^2$ and plugging it into Eq. (3) yields $$\alpha=\overline{C_2^2(t)}/\overline{C_1(t)C_2(t)} \qquad (4)$$

With α known, the noise from the sensor channel can be removed to extract the signal, which is given by $$S(t)=C_1(t)-C_2(t)/\alpha \qquad (5)$$

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A process for reducing noise from a light source in an in-line fiber-optic sensing element system, comprising:
sweeping laser light over a wavelength spectral range such that the sweeping allows mapping of light wavelength over time relative to sweeping cycles;
splitting the laser light to a sensor channel having an in-line fiber-optic sensing element with a spectral slope, where the in-line fiber-optic sensing element includes at least two chirped grating structures, and to a reference channel including a reference element with a spectral slope;

sensing intensity in light power from the in-line fiber-optic element; and using a controller to cancel the noise from the laser light using the signal from the reference channel by determining a correlation between outputs of the sensor and reference channels in the time domain and removing laser noises from the output of the sensor channel in the time domain, wherein the determining comprises evaluating time-domain waveforms of the light power corresponding to ramp up and ramp down slopes of the wavelength spectral range, determining position of waveform notches in the time-domain waveforms, monitoring position shifts of the waveform notches in the time domain, and determining strain as proportional to the position shifts of the waveform notches in the time domain.

2. The process of claim 1, wherein the in-line fiber-optic sensing element comprises:

an optically transmissive fiber including a core and an outer layer and a cleaved terminal end face;

a Fabry-Perot cavity defined by a portion of the optically transmissive fiber and at least two chirped fiber-Bragg grating structures, where the at least two chirped grating structures are separated from each other and are configured to reflect light, wherein the first grating structure period decreases towards the cleaved end face and the second grating structure period increases towards the cleaved end face.

3. The process of claim 2, wherein the optically transmissive fiber includes fused silica.

4. The process of claim 2, wherein the chirped fiber-Bragg grating structures include a first chirped fiber-Bragg grating structure having a first grating structure period and a second chirped fiber-Bragg grating structure having a second grating structure period that is the same as the first grating structure period.

5. The process of claim 2, wherein the chirped fiber-Bragg grating structures include a first chirped fiber-Bragg grating structure having a first grating structure period and a second chirped fiber-Bragg grating structure having a second grating structure period that is different than the first grating structure period.

6. The process of claim 1, wherein the sweeping comprises locking a laser wavelength onto a spectral wavelength with a specific wavelength slope.

7. The process of claim 1, wherein the sweeping comprises unlocking and relocking a laser wavelength on a different spectral wavelength with a specific slope.

8. The process of claim 1, where the laser light is generated by a wavelength-tunable laser source.

9. The process of claim 1, wherein the at least two chirped grating structures include a chirped fiber-Bragg grating structure.

* * * * *